(12) United States Patent
Izumi

(10) Patent No.: US 6,805,631 B2
(45) Date of Patent: Oct. 19, 2004

(54) GAME SYSTEM, GAME APPARATUS AND COMPUTER-READABLE STORAGE MEDIUM THEREFOR

(75) Inventor: Tadakatsu Izumi, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/793,325

(22) Filed: Feb. 26, 2001

(65) Prior Publication Data

US 2001/0018359 A1 Aug. 30, 2001

(30) Foreign Application Priority Data

Feb. 29, 2000 (JP) .................................... P2000-057961

(51) Int. Cl.[7] .............................................. A63F 13/00
(52) U.S. Cl. .......................................... 463/23; 463/1
(58) Field of Search ............................ 463/1, 7, 23, 8, 463/9, 40–42, 16

(56) References Cited

U.S. PATENT DOCUMENTS 5,772,508 A  6/1998  Sugita et al.
5,863,249 A  1/1999  Inoue
6,200,216 B1 *  3/2001  Peppel .......................... 463/1
6,402,152 B1 *  6/2002  Kutzik ......................... 463/23

* cited by examiner

Primary Examiner—Jessica Harrison
Assistant Examiner—Aaron Capron
(74) Attorney, Agent, or Firm—Jordan and Hamburg LLP

(57) ABSTRACT

A game system executes a game in which game elements appear in a progress of the game based on a predetermined appearing rates determined for each game element and the game elements are collected. The game system includes: a condition judging unit for judging a certain condition associated with the game at the time of starting the game; and an appearing rate varying unit for varying the predetermined appearing rate only for specific game element based on a result of the judgment by the condition judging unit and for permitting the specific game element to appear in a progress of the game based on the varied appearing rate.

6 Claims, 5 Drawing Sheets

FIG. 3

| JUDGMENT VALUE | GROUP | ITEM NAME | SERIAL No. | APPEARING RATE |
|---|---|---|---|---|
| 0 | A | ABC | 001 | 65.0% |
| | | BCD | 002 | 70.0% |
| | | CDE | 003 | 60.0% |
| | | DEF | 004 | 20.0% |
| | | EFG | 005 | 40.0% |
| | | ... | ... | ... |
| 1 | B | HJK | 081 | 20.0% |
| | | JKL | 082 | 25.0% |
| | | KLM | 083 | 60.0% |
| | | LMN | 084 | 40.0% |
| | | MNO | 085 | 88.0% |
| | | ... | ... | ... |
| 2 | C | XYX | 161 | 85.0% |
| | | YYX | 162 | 30.0% |
| | | OKU | 163 | 60.0% |
| | | ZZZ | 164 | 30.0% |
| | | ZYY | 165 | 40.0% |
| | | ... | ... | ... |
| 3 | D | RQA | 241 | 90.0% |
| | | OPR | 242 | 80.0% |
| | | ZOU | 243 | 60.0% |
| | | YWI | 244 | 50.0% |
| | | AIO | 245 | 36.0% |
| | | ... | ... | ... |

FIG. 4

| GROUP No. | SERIAL No. | APPEARING RATE BEFORE CHANGE |
|---|---|---|
| A | 001 | 65% |
| | 002 | 70% |
| | 003 | 60% |
| | 004 | 20% |
| | 005 | 40% |

54

×10%

| GAME START TIME APPEARING RATE AFTER CHANGE |
|---|
| 6.5% |
| 7.0% |
| 6.0% |
| 2.0% |
| 4.0% |

60

×200%

| CONDITION SATISFIED APPEARING RATE AFTER CHANGE |
|---|
| 13.0% |
| 14.0% |
| 12.0% |
| 4.0% |
| 8.0% |

65

GAME SYSTEM, GAME APPARATUS AND COMPUTER-READABLE STORAGE MEDIUM THEREFOR

BACKGROUND OF THE INVENTION

1. Field of the Invention

The present invention relates to a game system in which the game-player can collect game elements appearing in the progress of the game.

2. Description of the Prior Art

There is known a game system in which game elements such as items appear and the character controlled by the game-player uses them, and the appearing rate of the items varies dependently upon the importance and the like of items. In such a game system, generally, the appearing rate is set to be low for the items that have an effect of advancing the game advantageously, and the appearing rate is set to be high for the items that do not have such effect.

There is also known a game system in which the appearing rate of items varies according to a predetermined schedule. For example, in a game system having a concept of time, the appearing rate of items varies as the time passes, and hence the same items appear frequently at a certain time and appear less frequently at another time.

On the other hand, there is proposed a game system in which a plurality of game apparatuses are connected to each other via communication devices so that a plurality of game-players (i.e., user playing the game, hereinafter used in the same meaning) play the same game with exchanging data between those game apparatuses. Such a game system enables the game-players to exchange items between the game apparatuses, and the game-players can collect items in cooperation with each other.

In a conventional game system, the appearing rate of items is the same for everyone. Namely, important items appear with low appearing rate for every game-player, and less important items appear with high appearing rate for every game-player. Even in a game system in which the appearing rate of items varies according to a predetermined schedule, the same item appears with the same appearing rate for everyone at a certain time. Therefore, when plural game-players play the same game with communicating via the communication devices, it is less significant for the game-players to collect items in cooperation with each other.

SUMMARY OF THE INVENTION

It is an object of the present invention to provide a game system capable of varying the appearing rate of item between game-players.

According to one aspect of the present invention, there is provided a game system for executing a game in which game elements appear in a progress of the game based on a predetermined appearing rates determined for each game element and the game elements are collected, the game system including: a condition judging unit for judging a certain condition associated with the game at the time of starting the game; and an appearing rate varying unit for varying the predetermined appearing rate based on a result of the judgment by the condition judging unit and for permitting the game element to appear in a progress of the game based on the varied appearing rate.

In accordance with the game system thus configured, a certain condition associated with the game is judged at the time starting the game. All of the game elements are allotted with the appearing rate, which indicates the probability that the element appears in the game. The appearing rate of the game element is changed based on the judgment result. Then, in the progress of the game, the game elements appear based on the changed appearing rate. The certain condition associated with the game is mainly different between the players. The appearing rates of the game elements in the progress of the game may be differentiated between the players, and hence the players can enjoy collecting the game elements in cooperation with each other.

According to another aspect of the present invention, there is provided a game system for executing a game in which game elements appear in a progress of the game based on a predetermined appearing rates determined for each game element and the game elements are collected, the game system including: a condition judging unit for judging a certain condition associated with the game at the time of starting the game; and an appearing rate varying unit for varying the predetermined appearing rate only for specific game element based on a result of the judgment by the condition judging unit and for permitting the specific game element to appear in a progress of the game based on the varied appearing rate.

In accordance with the game system thus configured, a certain condition associated with the game is judged at the time starting the game. All of the game elements are allotted with the appearing rate, which indicates the probability that the element appears in the game. The appearing rates of the specific game elements change based on the judgment result. Then, in the progress of the game, the game elements appear based on the changed appearing rate. The certain condition associated with the game is mainly different between the players. The appearing rates of the game elements in the progress of the game may be differentiated between the players, and hence the players can enjoy collecting the game elements in cooperation with each other.

Each of the game elements may belong to one of a plurality of groups, and the appearing rate varying unit may decrease the predetermined appearing rate for the game element belonging to the specific groups based on the judgment result and permit the specific game element to appear in the progress of the game based on the decreased appearing rate. Therefore, the appearing rate of the specific game elements belonging to a certain group may be decreased in the progress of the game. By this, different groups of the game elements become difficult to collect for each player, and hence the players can enjoy collecting the game elements in cooperation with each other.

The game system may further include: a condition judging unit for judging whether or not a predetermined condition set during the game is satisfied; and a unit for increasing the appearing rate for the game elements belonging to the group decreased by the appearing rate varying unit when the predetermined condition is satisfied, and for permitting the game elements belonging to the specific group to appear based on the increased appearing rate. Therefore, in order to increase the appearing rate that has been decreased, the game player should satisfy the predetermined condition set in the game (e.g. stage clear condition), and hence the game-player may have a pleasure in achieving the condition.

The judgment of certain condition associated with the game at the time of starting the game may include judgment of information inputted by a game-player via an input device. Thus., the appearing rates of the game elements may be changed based on the information (e.g., the name and/or age of the game-player) inputted by the game-player via the input device. This enables differentiating the appearing rates of the game elements in the progress of the game, and hence the game-players may enjoy collecting the game elements in cooperation with each other.

The judgment of certain condition associated with the game at the time of starting the game may include judgment of time from a start of the game to a time when a predetermined signal is inputted via an input device. Thus, the appearing rates of the game elements may be changed based on the time from a start of the game to a time when a predetermined signal is inputted via an input device. This enables differentiating the appearing rates of the game elements in the progress of the game, and hence the game-players may enjoy collecting the game elements in cooperation with each other.

According to still another aspect of the present invention, there is provided a computer-readable storage medium for storing program which controls a computer to execute a game in which game elements appear in a progress of the game based on a predetermined appearing rate determined for each game element and the game elements are collected, the program controls the computer to function as: a condition judging unit for judging a certain condition associated with the game at the time of starting the game; and an appearing rate varying unit for varying the predetermined appearing rate only for specific game element based on a result of the judgment by the condition judging unit and for permitting the specific game element to appear in a progress of the game based on the varied appearing rate. By executing the program on the storage medium by the computer, the game system according to the present invention may be realized.

In the present invention, the game element is an object which the game-player uses in the game and the use of which affects the progress of the game (such as a result of a battle and/or story change). The example of the game element includes equipment and magic that the character appearing in the role-playing game or action game uses. Also, the character itself may be a game element. Further, the game element may include cards in a card collecting game.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 is a table showing information relating to items.

FIG. 4 is a table showing the manner in which appearing rates of items change.

DETAILED DESCRIPTION OF THE PREFERRED EMBODIMENTS

The preferred embodiment of the present invention will now be described below with reference to the attached drawings.

Figure 1:
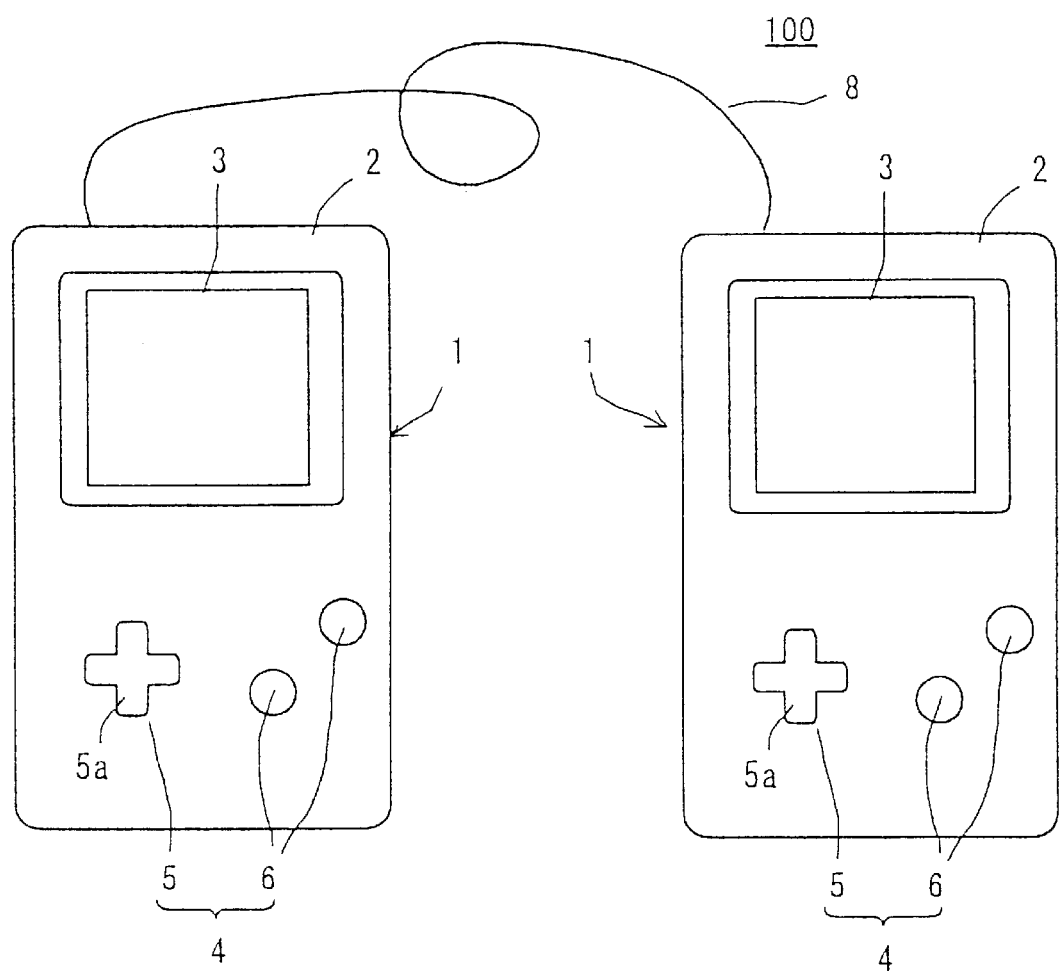
FIG. 1 is a diagram showing a game system according to an embodiment of the present invention.

FIG. 1 shows an embodiment of a game system according to the present invention. The game system 100 is configured by a pair of portable game apparatuses 1 connected with each other via a communication cable 8. Instead of the communication cable 8, an infrared communication means may be employed. Each of the portable game apparatuses 1 basically has the same configuration, and includes a body unit 2, a liquid crystal monitor 3 attached to the body unit 2 and serving as a display device, and an input device 4. It is noted that the plural game apparatuses employed in the game system of the present invention may have different configuration as far as they can execute the same game. In addition, it is noted that the present invention is applicable to a game system 100 including only one game apparatus.

The input device 4 has a direction instructing switch 5 and a plurality of push-button switches 6. The direction instructing switch 5 has a cross-shaped operation member 5a, for example, and outputs a signal corresponding to the manipulation in upward, downward, leftward or rightward of the member 5a (i.e., pressing at the up, down, left or right edges thereof). The configuration of such input device 4 is well known, and a lot of variation may be applied thereto. For example, in addition to the cross-shaped operation member 5a, a push-button switch may be provided for upward, downward, leftward and rightward direction.

Figure 2:
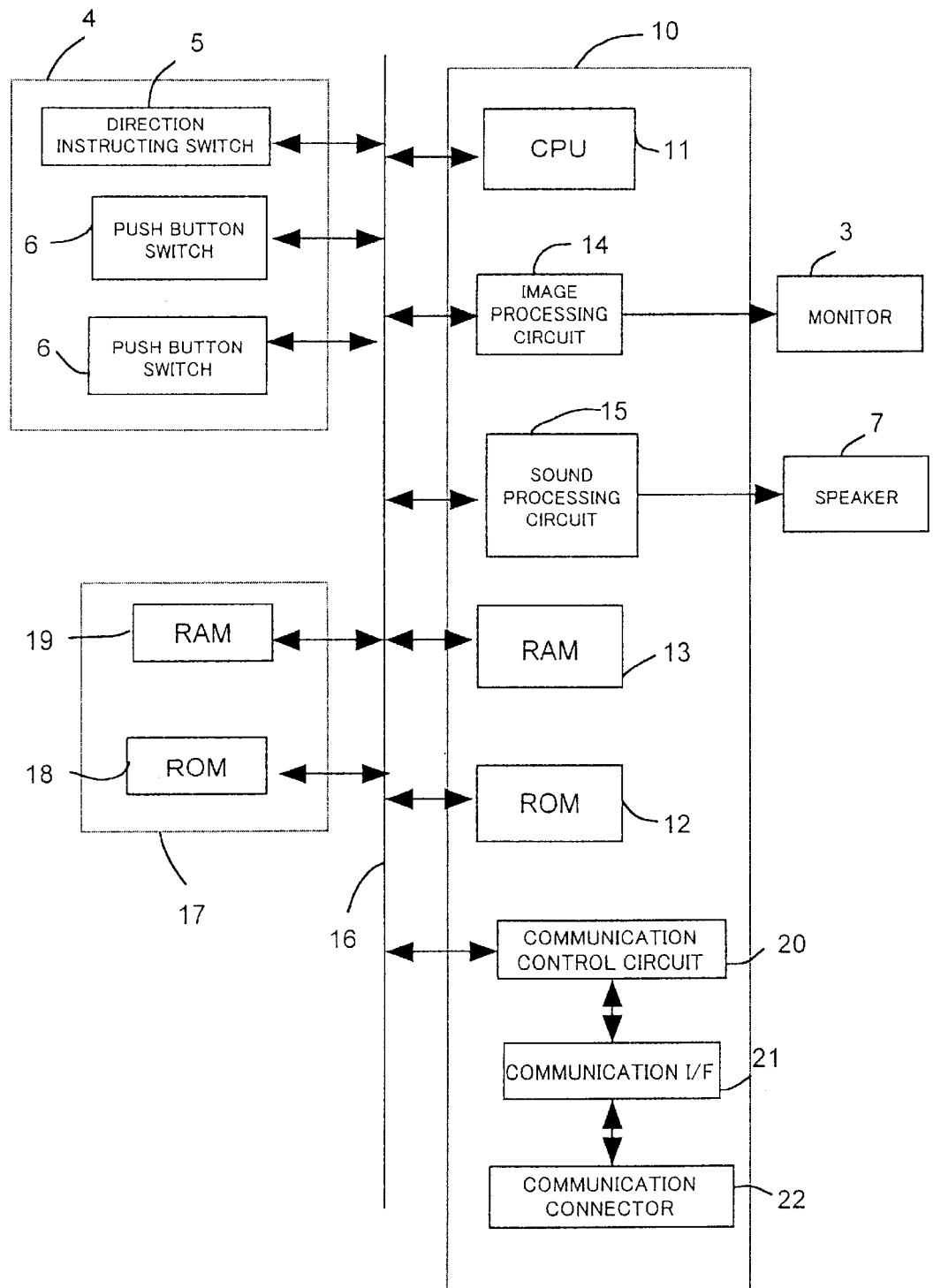
FIG. 2 is a block diagram showing a schematic configuration of control system of a game apparatus included in the game system shown in FIG. 1.

FIG. 2 shows a configuration of a control device 10 provided in each of the game apparatuses 1. The control device 10 is configured as a computer including a CPU 11, which utilizes a microprocessor as a major component. A ROM 12 and a RAM 13 serving as main storage devices, an image processing circuit 14, and a sound processing circuit 15 are connected to the CPU 11 via a bus 16. The ROM 12 stores a program necessary for the basic control (e.g., activation processing) of the game apparatus 1. In the RAM 13, a work area for the CPU 11 is produced. The image processing circuit 14 controls the liquid crystal monitor 3 in accordance with the display instruction from the CPU 11, and displays images on the monitor 3. The sound processing circuit 15 generates an analog audio signal corresponding to the sound generation instruction from the CPU 11, and outputs the audio signal to a speaker 7.

The switches 5, 6 of the input device 4 are connected to the CPU 11 via the bus 16 so that the CPU 11 can judge the operational condition of the switches 5, 6. To the bus 16, an external storage device 17 configured separately from the control device 10 is also connected. The external storage device 17 may be configured as a cassette attachable to and detachable from the body unit 2, for example, and includes a ROM 18 and a RAM 19 serving as storage media. The ROM 18 stores, in advance, a program for controlling the control device 10 to function as the respective means for the present invention as well as various data necessary for the execution of the program. The RAM 19 stores, in advance, save data for the game. The data in the RAM 19 may be retained by an auxiliary battery in the external storage device 17, for example. Instead of the RAM 19, a rewritable ROM such as an EEPROM may be used. The storage media in the external storage device 17 are not limited to the semiconductor storage element, and various storage media such as a magnetic storage medium, an optical storage medium and a magneto-optical storage medium may be used. It is noted that, while an interface circuit is provided between the bus 16 and the respective components as necessary, they are not illustrated for the sake of brevity. The configuration of the control device 10 is not limited to the type illustrated, and a control device of other type may be used.

In order to perform data communication between the game apparatuses 1, the CPU 11 is connected to a communication control circuit 20 via the bus 16, and the communication control circuit 20 is connected to a communication connector 22 via a communication interface 21. Thus, the communication cable 8 is connected to the communication connectors 22 of each game apparatus 1 so that the data communication between the game apparatuses 1 is achieved. The communication means between the game apparatuses 1 is not limited to the wired communication via the communication cable 8, and wireless communication such as infrared communication may be used. Further, two or more communication means may be simultaneously used.

In the game system 100 thus configured, games of various genre may be played on the monitor 3 by means of the CPU 11 which loads the program stored in the ROM 18 of the external storage device 17 into the RAM 13 and executes the program. In this embodiment, the game-player controls a certain character in the game (hereinafter referred to as "player character") via the input device 4 to repeatedly perform adventure and/or battle in the game. Thus, the player character collects various game elements (hereinafter referred to as "item") prepared in advance in the data stored on the ROM 18, and the story of the game progresses according to the collection result of the items. The following description is made for such game execution condition.

The items include weapons and protective equipments used by the player character, as well as an energy tank which determines the usability of the weapons, for example, and they are distinguished or classified in various views such as the effect, frequency of use and so on. The ability and/or physical fitness vary dependently upon the item to be used, and consequently the dominance in battle or progress degree in adventure changes. These items sometimes appear during the adventure of the player character and/or as a result of the battle between the player character and other character.

FIG. 3 shows information relating to each item. As shown, each item belongs to one of four groups 51, and each item is allotted with a serial number 53 in one-to-one correspondence. The items are classified into four groups 51 such that each group has generally the same number of items. The number of the group 51 may be more than four. The appearing rate 54 is set to each item, and the appearance of the item is controlled based on the appearing rate 54. Namely, the items having large appearing rate 54 appear with high probability (i.e., appears frequently), and hence the player character can easily get those items. By way of example, the item that appears if the player character defeats an enemy character frequently appears as its appearing rate is high. The appearing rate 54 is determined in accordance with the importance of the item. For example, items such as a weapon of high attaching power and/or a protective equipment of high protection power have high importance, and hence the appearing rates 54 for them are set to be low. The information shown in FIG. 3 are determined by the producer of the game in advance and written into the ROM 18 as a part of game data together with other information indicating feature and/or attribute of the items, such as the using condition and/or effect of the item.

The characteristic feature of the present invention is to uniformly change the appearing rates of the items belonging to a group or groups 51 specified based on a judgment result of certain condition associated with the game at the game staring time. For example, if the specified group 51 is the group-A, as shown in FIG. 4, the appearing rates 54 of all items belonging to the group-A are uniformly decreased by multiplying the appearing rates 54 by a predetermined rate "10%". Therefore, all items belonging to the group-A appear less frequently than the items belonging to other groups. It is noted that the appearing rate 60, which is obtained by multiplying the appearing rate 54 by a predetermined rate may be written in the ROM 18 in advance. In that case, for example, a flag "1" is allotted to the appearing rate 54 and a flag "2" is allotted to the appearing rate 60. The flag "2" is set to the group or groups specified based on the judgment result of a certain condition associated with the game at the time when the game starts, and the flag "1" is set to other groups 51.

The judgment of a certain condition associated with the game at the time of starting the game includes judgment of information that the game-player inputted via the input device 4 at the time of starting the game and judgment of time from the start of the game to the input of a certain signal via the input device 4. As a result of the judgment, a number to judge the condition (hereinafter referred to as "judgment value 55") is determined. As shown in FIG. 3, the judgment value 55 is allotted to each group. While the judgment values are "0", "1", "2" and "3" in the example of FIG. 3, they may range in a certain values.

In order to enable such processing, the CPU 11 in each game system 1 produces data relating to the appearing rates 54 for the items belonging to each group, and stores them in the RAM 13.

Next, with reference to FIG. 5, the description will be given of the process for varying the item appearing rates based on the judgment result of a certain condition associated with the game at the time of starting the game. It is noted that the following process is executed by the CPU 11 based on the game program that is read out from the ROM 18 in the external storage medium 17 and loaded into the RAM 13.

Figure 5:
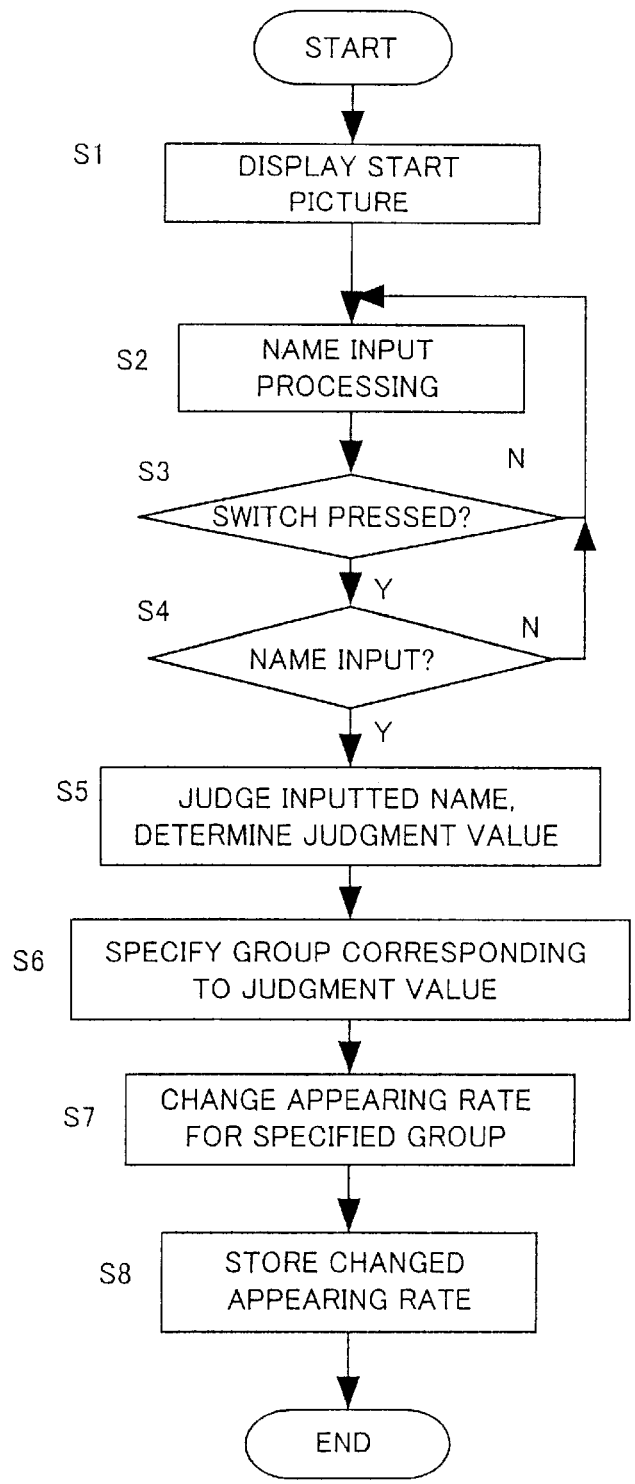
FIG. 5 is a flowchart showing process for changing item appearing rates belonging to a part of groups based on judgment result of a certain condition associated with the game at the time of starting the game.

In the process shown in FIG. 5, when the game is started, a start picture is shown on the liquid crystal monitor 3, and a message is shown which requests the game-player to input the name of the player character (step S1). Then, the CPU 11 executes name input processing, with monitoring the signal outputted from the input device 2 in response to the manipulation by the game-player (step S2). Namely, the name of the player character corresponding to the manipulation of the input device 2 by the game-player is displayed on the name input area on the screen of the monitor 3. When the game-player presses down the predetermined push-button switch 6, the CPU 11 detects it (step S3), and determines whether or not the name is inputted (step S4). If it is determined that the name is inputted, the name is judged (step S5), and the judgment value 55 is determined. In the example of FIG. 3, the judgment value 55 is set to "0" if the code (e.g., ASCII code) corresponding to the inputted name ranges between "00" to "40" in hexadecimal, set to "1" if the code ranges between "41" to "80", set to "2" if the code ranges between "81" to "C0" and set to "3" if the code ranges between "C1" to "FF". The judgment value 55 may be determined by various way. For example, the judgment value 55 may be determined based on the range of the reminder obtained by dividing the code in one-to-one correspondence with the inputted name by a certain value, or may be determined by using a random number generated based on the inputted name. Also, the object of the judgment is not limited to the name of the player character, and other information that may be inputted by the game-player, e.g., the age of the game-player, may be used.

Then, the group corresponding to the judgment value 55 is specified (step S6). For example, if the judgment value 55 is "0", the group-A is specified as seen in FIG. 3. Then, the appearing rates 54 for all items belonging to the specified group are read out from the RAM 13, and a predetermined value is multiplied to vary the appearing rates 54 (step S7). For example, as shown in FIG. 4, the appearing rates 54 of the all items belonging to the group-A are multiplied by the predetermined rate 0.1 (10%) so that the appearing rates 54 are decreased to the appearing rates 60. The predetermined rate may be arbitrarily set by the game producer, and the appearing rate 54 is varied accordingly. The appearing rates (e.g., the appearing rate 60 shown in FIG. 4) after the multiplication of the predetermined rate are stored in a certain area in the RAM 13 (step S8). The appearing rates 54 for the groups other than the groups specified in step S6 are not varied. Thus, in this example, only the appearing rates for the items belonging to the group-A are varied to be uniformly smaller than the appearing rates for other groups, and the game progresses in that condition. Since the appearing rates of the items may be partially varied in accordance with the information inputted by the game-player, the appearing rate for the same item may be changed in the progress of the game if the plural game-players input different information from each other. This enables distinguishing the collected items between the game-players, and they can find the pleasure in collecting items in cooperation with each other. For example, in the case where a plurality of game apparatuses are connected with each other by the communication interface 21 so that a plurality of game-player plays the same game, a game-player can exchange the item, that is difficult to collect, between other game-players to collect desired items in cooperation with other game-players. Since the details of the data communication between the plural game apparatuses are not directly related to the heart of the invention, the detailed description thereof will be omitted.

Subsequently, the game progresses, and when the predetermined condition set in the game is satisfied, e.g., the player character defeated the boss-character appeared in the game, the changed appearing rates stored in the RAM 13 are read out, and the predetermined rate is multiplied to again change the appearing rates. For example, as shown in FIG. 4, the appearing rates 60 are multiplied by the predetermined rate "200%" to produce the new appearing rates 65, which are then stored in the predetermined area in the RAM 13. Thereafter, items appear based on the new appearing rate 65. The above processing maybe repeated every time when the predetermined condition is satisfied. By this, the appearing rate may be gradually increased every time when the player character defeats the boss character in the game.

In step S5, the time from the start of the game to the input of the predetermined signal via the input device 4 may be judged. For example, it is possible to judge the time from the activation of the game program until the game-player presses down a switch on the input device 4 and the CPU 11 detects it, thereby to determine the judgment value 55. Alternatively, certain information may be displayed on the liquid crystal monitor 3 in a flashing manner and the timing at which the game-player presses down a switch on the input device 4 may be judged. For example, it is possible to determine the judgment value 55 by judging whether the switch press-down timing is immediately after the information display, or immediately after the disappearance of the information display or immediately before the disappearance of the information display.

In the above-described embodiment, items are classified into groups. Alternatively to this, the appearing rate may be varied, by the unit of item, based on the judgment result of a certain condition associated with the game at the time of starting the game.

As described above, according to the present invention, the appearing rate for some items set in the game may be varied based on the judgment result of a certain condition associated with the game at time of starting the game. Therefore, the appearing rates for some game elements may be differentiated for each game-players in the progress of the game. Thus, the game-players may find pleasure in collecting the items in cooperation with each other.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-057961 filed on Feb. 29, 2000 including the specification, claims, drawings and summary is incorporated herein by reference in its entirety.

What is claimed is:

1. A game system for executing a game in which game elelments appear in a progress of the game based on a predetermined appearing rate determined for each of the game elements and the game elements are collected by a player when the game elements appears, the game system comprising:

a condition judging means for judging a certain condition based upon a player input made via an input device by the player during initiation of the game and prior to a starting the game; and an appearing rate varying means for varying the predetermined appearing rates for at least some of the game elements based on a result of the judgment by the condition judging means prior to a starting of the game and for permitting the game elements to appear in a progress of the game at a frequency based on the predetermined appearing rates wherein the predetermined appearing rates as varied at the initiation of the game are maintained fixed after starting the game and throughout execution of the game, wherein the judgment of the certain condition associated with the game at the time of starting the game includes judgment of time from an initiation of the game to a time when a predetermined signal is inputted by the player via the input device prior to the starting of the game.

2. The game system according to claim 1, wherein the game elements are divided into a plurality of groups, wherein the appearing rate varying means varies the predetermined appearing rates by decreasing the predetermined appearing rates only for the game elements belonging to specific groups of the plurality of groups based on the judgment result.

3. The game system according to claim 1, wherein the appearing rate varying means varies the predetermined appearing rates by decreasing the predetermined appearing rates for each the game elements based on the judgment result.

4. A computer-readable storage medium for storing a program which controls a computer to execute a game in which game elements appear in a progress of the game based on a predetermined appearing rate determined for each the game elements and the game elements are collected by a player when the game elements appear, the program controls the computer to function as:

a condition judging means for judging a certain condition based upon a player input made via an input device by the player during initiation of the game and prior to a starting the game; and an appearing rate varying means for varying the predetermined appearing rates for at least some of the game elements based on a result of the judgment by the condition judging means prior to a starting of the game and for permitting the game elements to appear in a progress of the game at a frequency based on the predetermined appearing rates wherein the predetermined appearing rates as varied at the initiation of the game are maintained fixed after starting the game and throughout execution of the game, wherein the judgment of the certain condition associated with the game at the time of starting the game includes judgment of time from an initiation of the game to a time when a predetermined signal is inputted by the player via the input device prior to the starting of the game.

5. The computer readable storage medium according to claim 4, wherein the game elements are divided into a plurality of groups, wherein the appearing rate varying means varies the predetermined appearing rates by decreasing the predetermined appearing rates only for the game elements belonging to specific groups of the plurality of groups based on the judgment result.

6. The computer readable storage medium according to claim 4, wherein the appearing rate varying means varies the predetermined appearing rates by decreasing the predetermined appearing rates for each the game elements based on the judgment result.

* * * * *